(12) United States Patent
Shimamoto et al.

(10) Patent No.: US 11,750,133 B2
(45) Date of Patent: Sep. 5, 2023

(54) EXTERNAL FORCE ESTIMATION DURING MOTOR CONTROL

(71) Applicant: KABUSHIKI KAISHA YASKAWA DENKI, Fukuoka (JP)

(72) Inventors: Keita Shimamoto, Fukuoka (JP); Tsuyoshi Yokoya, Fukuoka (JP)

( * ) Notice: Subject to any disclaimer, the term of this patent is extended or adjusted under 35 U.S.C. 154(b) by 0 days.

(21) Appl. No.: 17/574,581

(22) Filed: Jan. 13, 2022

(65) Prior Publication Data
US 2023/0006590 A1 Jan. 5, 2023

Related U.S. Application Data

(63) Continuation of application No. PCT/JP2020/014290, filed on Mar. 27, 2020.

(60) Provisional application No. 62/940,912, filed on Nov. 27, 2019.

(30) Foreign Application Priority Data

Jul. 18, 2019 (WO) ................. PCT/JP2019/028261

(51) Int. Cl.
*H02P 23/14* (2006.01)
(52) U.S. Cl.
CPC .................................. *H02P 23/14* (2013.01)
(58) Field of Classification Search
CPC ............................. H02P 23/14; G05B 17/02
USPC .................................................. 318/445, 434
See application file for complete search history.

(56) References Cited

U.S. PATENT DOCUMENTS

| | | | |
|---|---|---|---|
| 4,772,161 A | 9/1988 | Nagao et al. | |
| 4,886,529 A | 12/1989 | Hashimoto et al. | |
| 4,967,127 A | 10/1990 | Ishiguro et al. | |
| 5,994,864 A | 11/1999 | Inoue et al. | |
| 7,341,432 B2* | 3/2008 | Sung | F04B 49/06 318/459 |
| 7,456,592 B2* | 11/2008 | Yoo | F04B 35/045 318/632 |

(Continued)

FOREIGN PATENT DOCUMENTS

| | | |
|---|---|---|
| CN | 105409110 | 3/2016 |
| CN | 108508784 | 9/2018 |

(Continued)

OTHER PUBLICATIONS

International Preliminary Report on Patentability with Written Opinion dated Jan. 18, 2022 for PCT/JP2019/028261.

(Continued)

*Primary Examiner* — David Luo
(74) *Attorney, Agent, or Firm* — SOEI PATENT & LAW FIRM

(57) ABSTRACT

A control system may include: a motor configured to power a driven object; and circuitry configured to: generate a first driving force command to drive the motor during a first control; estimate a first force acting on the motor during the first control based, at least in part, on the first driving force command; generate a second driving force command to drive the motor during a second control after the first control; estimate a second force acting on the motor during the second control based, at least in part, on the second driving force command; and estimate an external force acting on the driven object during the second control based, at least in part, on a comparison between the first force and the second force.

20 Claims, 11 Drawing Sheets

(56) References Cited

U.S. PATENT DOCUMENTS

| | | |
|---|---|---|
| 2012/0000891 A1 | 1/2012 | Nakanishi et al. |
| 2013/0073085 A1 | 3/2013 | Oaki et al. |
| 2014/0139170 A1 | 5/2014 | Tian |
| 2016/0141994 A1 | 5/2016 | Takase |
| 2016/0354933 A1 | 12/2016 | Sato |
| 2018/0107174 A1 | 4/2018 | Takahashi |
| 2018/0154526 A1 | 6/2018 | Oguri et al. |
| 2018/0246491 A1 | 8/2018 | Shinoda et al. |

FOREIGN PATENT DOCUMENTS

| | | |
|---|---|---|
| JP | S62-203756 | 9/1987 |
| JP | S63-047058 | 2/1988 |
| JP | H2-015956 | 1/1990 |
| JP | H4-135189 | 5/1992 |
| JP | 2001-038673 | 2/2001 |
| JP | 2009-297827 | 12/2009 |
| JP | 2011-125986 | 6/2011 |
| JP | 2012-011403 | 1/2012 |
| JP | 2013-066965 | 4/2013 |
| JP | 2013-225284 | 10/2013 |
| JP | 2014-155986 | 8/2014 |
| JP | 2016-028842 | 3/2016 |
| JP | 2017-001122 | 1/2017 |
| JP | 2018-065221 | 4/2018 |
| JP | 2018-089744 | 6/2018 |
| WO | 2019/065427 | 4/2019 |

OTHER PUBLICATIONS

International Search Report dated Sep. 17, 2019 for PCT/JP2019/028261.
International Search Report dated Jun. 16, 2020 for PCT/JP2020/014290.
International Preliminary Report on Patentability with Written Opinion dated Jan. 27, 2022 for PCT/JP2020/014290.
Soei Patent and Law Firm, Statement of Related Matters, dated Feb. 9, 2022.
International Search Report dated Feb. 2, 2021 for PCT/JP2020/044359.
International Preliminary Report on Patentability with Written Opinion dated Jun. 9, 2022 for PCT/JP2020/044359.
Extended Search Report in corresponding European Application No. 19937854.8, dated Feb. 22, 2023.
Office Action issued in Chinese Patent Application No. 202080051279.X, dated Jul. 20, 2023 (with English translation).

* cited by examiner

Fig.2

| DRIVING TIME | POSITION | SPEED | FIRST EXTERNAL FORCE |
|---|---|---|---|
| | | | |
| | | | |
| | | | |
| | | | |
| | | | |
| | | | |
| | | | | ured herein by reference.
EXTERNAL FORCE ESTIMATION DURING MOTOR CONTROL

CROSS-REFERENCE TO RELATED APPLICATIONS

This application is a continuation application of PCT Application No. PCT/JP2020/014290 filed on Mar. 27, 2020, which in turn claims the benefit of priority to both PCT Application No. PCT/JP2019/028261 filed on Jul. 18, 2019 and U.S. Provisional Application No. 62/940,912 filed on Nov. 27, 2019, the entire contents of which are incorporated herein by reference.

BACKGROUND

Field

Japanese Patent Unexamined Publication No. 2012-11403 discloses a robot system in which an estimated disturbance torque is obtained by a disturbance observer from a torque command to a motor for each axis of a robot and a speed detection value of each axis, and after high-pass filter processing is performed on the estimated disturbance torque, coordinate transformation is performed to estimate an external force.

SUMMARY

Disclosed herein is an example robot system. The control system may include: a motor configured to power a driven object; and circuitry configured to: generate a first driving force command to drive the motor during a first control; estimate a first force acting on the motor during the first control based, at least in part, on the first driving force command; generate a second driving force command to drive the motor during a second control after the first control; estimate a second force acting on the motor during the second control based, at least in part, on the second driving force command; and estimate an external force acting on the driven object during the second control based, at least in part, on a comparison between the first force and the second force.

Additionally, an example control method is disclosed herein. The control method may include: generating a first driving force command to drive a motor during a first control, wherein the motor is configured to power a driven object; estimating a first force acting on the motor during the first control based, at least in part on the first driving force command; generating a second driving force command to drive the motor during a second control; estimating a second force acting on the motor during the second control based, at least in part on the second driving force command; and estimating an external force acting on the driven object based, at least in part, on a difference between the first force and the second force.

Additionally, an example non-transitory memory device is disclosed herein. The non-transitory memory device may have instructions stored thereon that, in response to execution by a processing device, cause the processing device to perform operations including: generating a first driving force command to drive a motor during a first control, wherein the motor is configured to power a driven object; estimating a first force acting on the motor during the first control based, at least in part on the first driving force command; generating a second driving force command to drive the motor during a second control; estimating a second force acting on the motor during the second control based, at least in part on the second driving force command; and estimating an external force acting on the driven object based, at least in part, on a difference between the first force and the second force.

BRIEF DESCRIPTION OF THE DRAWINGS

FIG. 2 is a table illustrating a profile.

DETAILED DESCRIPTION

In the following description, with reference to the drawings, the same reference numbers are assigned to the same components or to similar components having the same function, and overlapping description is omitted.

Control System A control system 1 may be a system for controlling a driven object to perform a desired operation by using a motor. The shape, the structure, and the size of the driven object and the number and the size of the motors are not particularly limited. Hereinafter, a case where one motor exists and the driven object is one rigid body will be described.

Figure 1:
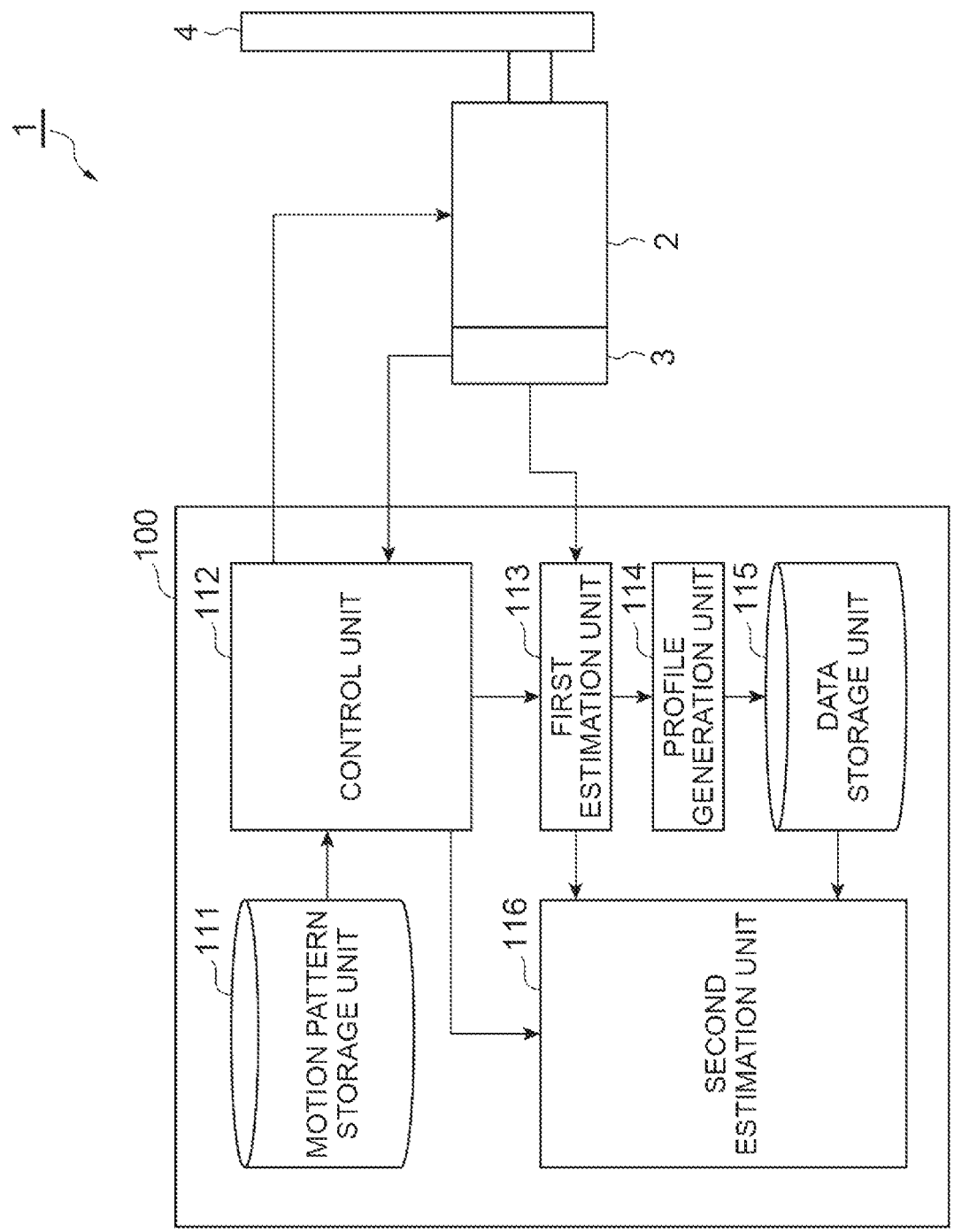
FIG. 1 is a schematic diagram illustrating a configuration of a control system.

As illustrated in FIG. 1, the control system 1 includes a motor 2, a sensor 3, and a control device 100. The motor 2 drives a driven object 4. The motor 2 may be a rotary motor that rotationally drives the driven object 4 or a linear motor that displaces the driven object 4 along a straight line. The motor 2 may be a synchronous motor or an induction motor. The motor 2 may be a permanent-magnet synchronous motor such as a surface permanent magnet (SPM) motor or an interior permanent magnet (IPM) motor, or may be a synchronous motor having no permanent magnets such as a synchronous-reluctance motor.

The sensor 3 detects a response value of the motor 2 corresponding to the control command. Examples of the response value may include the position or speed of the motor 2. If the motor 2 is a rotary type, the rotation angle of the output shaft of the motor 2 corresponds to the "position", and the rotation speed of the output shaft of the motor 2 corresponds to the "speed". Examples of the sensor 3 may include a rotary encoder that outputs a pulse signal having a frequency proportional to the operating speed of the motor 2. By using the rotary encoder, both the position and the speed of the motor 2 can be acquired.

The control device 100 is configured to control the motor 2 to control the driven object 4 to perform a desired operation. The control device 100 is further configured to estimate an external force acting on the driven object 4 by a sensorless method without using the force sensor. As described in the examples later, the control device 100 may control the motor 2 based on the estimated external force, may detect contact between the driven object 4 and the surrounding object based on the estimated external force, or may estimate the state of the surrounding object based on the estimated external force.

An external force (a first force or a second force) acting on the motor 2 can be estimated based on the driving force command (a first driving force command or a second driving force command) by the control device 100. For example, if the driving force generated by the motor 2 sufficiently follows the driving force command, it can be estimated that the external force substantially matching the driving force command is acting on the motor 2.

Since the external force acting on the driven object 4 is also transmitted to the motor 2, the external force acting on the motor 2 includes the external force acting on the driven object 4. However, the external force acting on the motor 2 includes at least an inertia force of the driven object 4 in addition to the external force acting on the driven object 4. Furthermore, the external force acting on the motor 2 includes components that are difficult to model, such as Coulomb friction, viscous friction, and variations in the shape, the size, and the weight of the driven object 4. Accordingly, it is difficult to estimate the external force acting on the driven object 4 with accuracy based on the external force acting on the motor 2. In contrast, the control device 100 improves the estimation accuracy of the external force acting on the driven object 4 by a sensorless method.

The control device 100 is configured to: drive the motor 2, estimate a first external force (the first force) acting on the motor 2 based, at least in part, on a driving force command for driving the motor 2 (the first driving force command generated to drive the motor 2 during a first control), store a profile representing a transition of an estimation value of the first external force (a first force profile representing the first force over time during a duration of the first control) in the data storage unit, and estimate a second external force (external force) acting on the driven object 4 based on the newly estimated first external force (the second force estimated based, at least in part, on the second driving force command generated to drive the motor 2 during a second control) and the profile stored in the data storage unit when driving the motor 2 based on a predetermined motion pattern. For example, the control device 100 includes a motion pattern storage unit 111, a control unit 112, a first estimation unit 113, a profile generation unit 114, a data storage unit 115, and a second estimation unit 116 as functional configuration (hereinafter referred to as "functional block").

The motion pattern storage unit 111 is configured to store at least one motion pattern (common motion pattern). The motion pattern represents the transition (temporal change) of the motion target value of the motor 2. For example, the motion pattern includes at least one motion command. The motion command defines at least the target position of the driven object 4. The motion command may include the target speed of the driven object 4 instead of the target position of the driven object 4, or may include both the target position and the target speed of the driven object 4. The motion pattern may include a plurality of motion commands in time series. The motion pattern storage unit 111 may store a plurality of motion patterns. Each of the plurality of motion patterns may be a unit program for configuring a motion program for controlling the driven object 4 to perform a series of motions.

The control unit 112 is configured to drive the motor 2 (perform the first control and the second control). For example, the control unit 112 generates driving electric power for operating the driven object 4 based on the motion pattern stored in the motion pattern storage unit 111, and supplies the driving electric power to the motor 2. For example, the control unit 112 acquires information on the current position and the current speed of the driven object 4 based on the detection value of the sensor 3, and generates the driving electric power so that the current position and the current speed follow the target position and the target speed, respectively.

For example, the control unit 112 executes a proportional operation, a proportional-integral operation, or a proportional-integral-differential operation on the deviation between the target position and the current position (hereinafter referred to as "positional deviation") to calculate a target speed for reducing the position deviation. The control unit 112 further executes a proportional operation, a proportional-integral operation, or a proportional-integral-differential operation on the deviation between the target speed and the current speed (hereinafter referred to as "speed deviation") to calculate a driving force command for reducing the speed deviation.

If the motor 2 is a rotary type, the torque of the output shaft of the motor 2 corresponds to the driving force. The control unit 112 calculates a current command for controlling the driving force of the motor 2 to follow the driving force command, and generates the driving electric power so as to supply the motor 2 with driving current corresponding to the current command.

The first estimation unit 113 estimates the first external force acting on the motor 2 (the first force or the second force) based, at least in part, on the driving force command in the control unit 112 (the first driving force command or the second driving force command). For example, the first estimation unit 113 may output a power matching the driving force command as the estimation result of the first external force. If the drive current matches the current command, the drive current and the driving force command are correlated. In such a case, being based on the detected value of the driving current and being based on the current command are substantially synonymous with being based on the driving force command.

The first estimation unit 113 may be a disturbance observer configured to estimate the first external force based, at least in part, on the driving force command and a response value of the motor 2. For example, the first estimation unit 113 may further be configured to: estimate a first disturbance acting on the motor 2 as the first force based, at least in part, on the first driving force command and a motion of the motor 2 responding to the first driving force command; and estimate a second disturbance acting on the motor 2 as the second force based, at least in part, on the second driving force command and a motion of the motor 2 responding to the second driving force command. For example, the first estimation unit 113 may estimate an inertia force acting on the motor 2 from the driven object 4 based on the response value (for example, current speed and current position) of the motor 2 and a known rigid body model of the driven object 4, and output a value obtained by subtracting the inertia force from the driving force command as the estimation result of the first external force.

The profile generation unit 114 is configured to generate the profile representing a transition of the estimation value estimated by the first estimation unit 113. For example, the profile generation unit 114 repeatedly acquires an estimation value of the first external force from the first estimation unit 113 in a period in which the control unit 112 drives the motor 2 based on the motion pattern stored in the motion pattern storage unit 111, and generates the profile representing a temporal change of the estimation value of the first external force in the period. The profile thus generated represents the transition of the estimation value estimated by the first estimation unit 113 when the control unit 112 drove the motor 2 based on the motion pattern in the past.

The profile generation unit 114 may generate the profile in a state where the external force is not applied to the driven object 4. The profile thus generated represents the transition of the estimation value estimated by the first estimation unit 113 in a state where the external force is not acting on the driven object 4.

If the motion pattern storage unit 111 stores a plurality of motion patterns, the profile generation unit 114 may generate the profile for each of the plurality of motion patterns. Accordingly, a plurality of profiles respectively corresponding to the plurality of motion patterns are generated. Each of the plurality of profiles represents a transition of an estimation value estimated by the first estimation unit 113 when the control unit 112 drives the motor 2 in the past based on the corresponding motion pattern.

The data storage unit 115 is configured to store the profile generated by the profile generation unit 114. The data storage unit 115 may store the above-described plurality of profiles. The data storage unit 115 may store the estimation value of the first external force and the motion pattern in association with each other.

Figure 2:
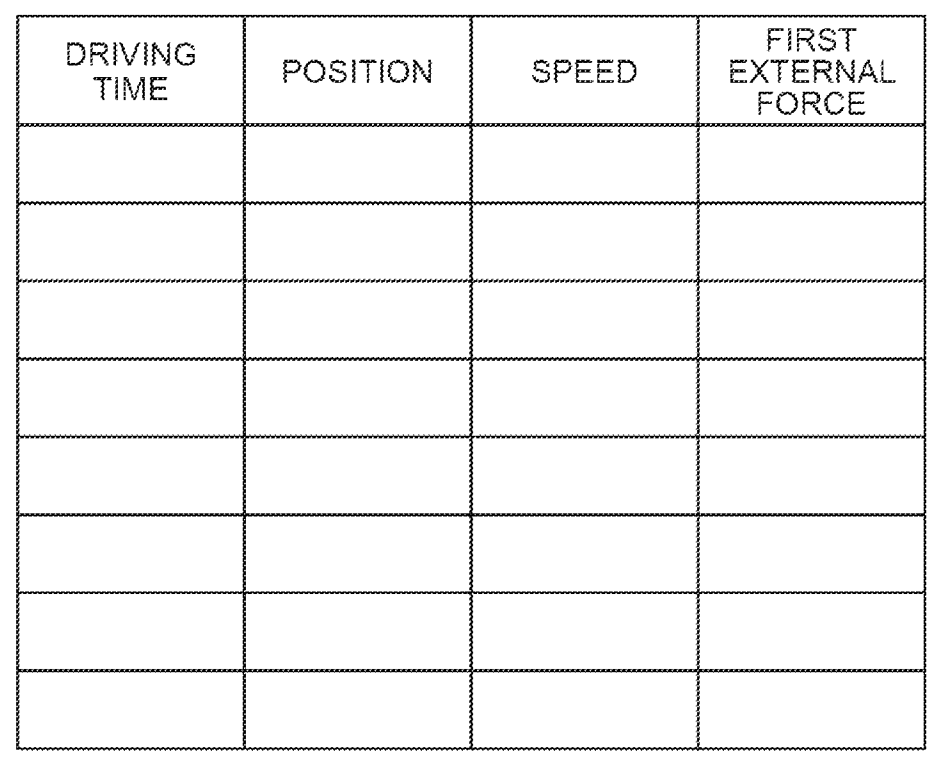

FIG. 2 is a table illustrating a profile. The profile includes a plurality of time-series records. Each record includes a driving time, a position, a speed, and an estimation value of the first external force. The driving time is elapsed time from the start time of the motion of the motor 2 based on the motion pattern to the time when the first external force is estimated (driving time of the motor 2 based on motion pattern). The position is the position of the motor 2 when the first external force is estimated. The position may be a target position or the position detected by the sensor 3. The speed is the speed of the motor 2 when the first external force is estimated. The speed may be a target speed or the speed detected by the sensor 3. The data storage unit 115 may store, as the profile, a function representing the relationship between the elapsed time and the position, a function representing the relationship between the elapsed time and the speed, a function representing the relationship between the elapsed time and the estimation value of the first external force, or the like, instead of discrete values as illustrated in FIG. 2.

As described above, the motion pattern may be a unit program for configuring a motion program. In this case, the profile corresponding to the motion program can be easily generated by connecting the profile corresponding to the plurality of motion patterns in accordance with the execution order of the plurality of motion patterns in the motion program, so that the profile corresponding to the motion program can be easily generated.

The second estimation unit 116 is configured to estimate the second external force acting on the driven object 4 based on the estimation value newly estimated by the first estimation unit 113 (hereinafter referred to as "new estimation value") and the profile stored in the data storage unit 115 when the control unit 112 drives the motor 2 based on the motion pattern. For example, the second estimation unit 116 extracts an estimation value corresponding to the new estimation value (hereinafter referred to as "estimation value of comparison target") from the profile, and estimates the second external force (external force) based on the difference between the new estimation value (the second force) and the estimation value of comparison target (a base value). For example, the second estimation unit 116 outputs a value obtained by subtracting the estimation value of comparison target from the new estimation value as the estimation result of the second external force.

For example, the second estimation unit 116 may extract the estimation value of comparison target from the profile based on the driving time according to the motion pattern (elapsed time 9 from start of motion of the motor 2 based on motion pattern). For example, the second estimation unit 116 extracts the estimation value corresponding to the driving time at the time when the first estimation unit 113 outputs the new estimation value from the profile.

The second estimation unit 116 may extract an estimation value corresponding to the newly estimated estimation value from the profile based on the response value of the motor 2. For example, the second estimation unit 116 may extract an estimation value corresponding to the position of the motor 2 at the time when the first estimation unit 113 outputs a new estimation value from the profile. The second estimation unit 116 may extract an estimation value corresponding to the speed of the motor 2 at the time when the first estimation unit 113 outputs a new estimation value from the profile. The second estimation unit 116 may extract an estimation value corresponding to the position and the speed of the motor 2 at the time when the first estimation unit 113 outputs a new estimation value from the profile.

Figure 3:
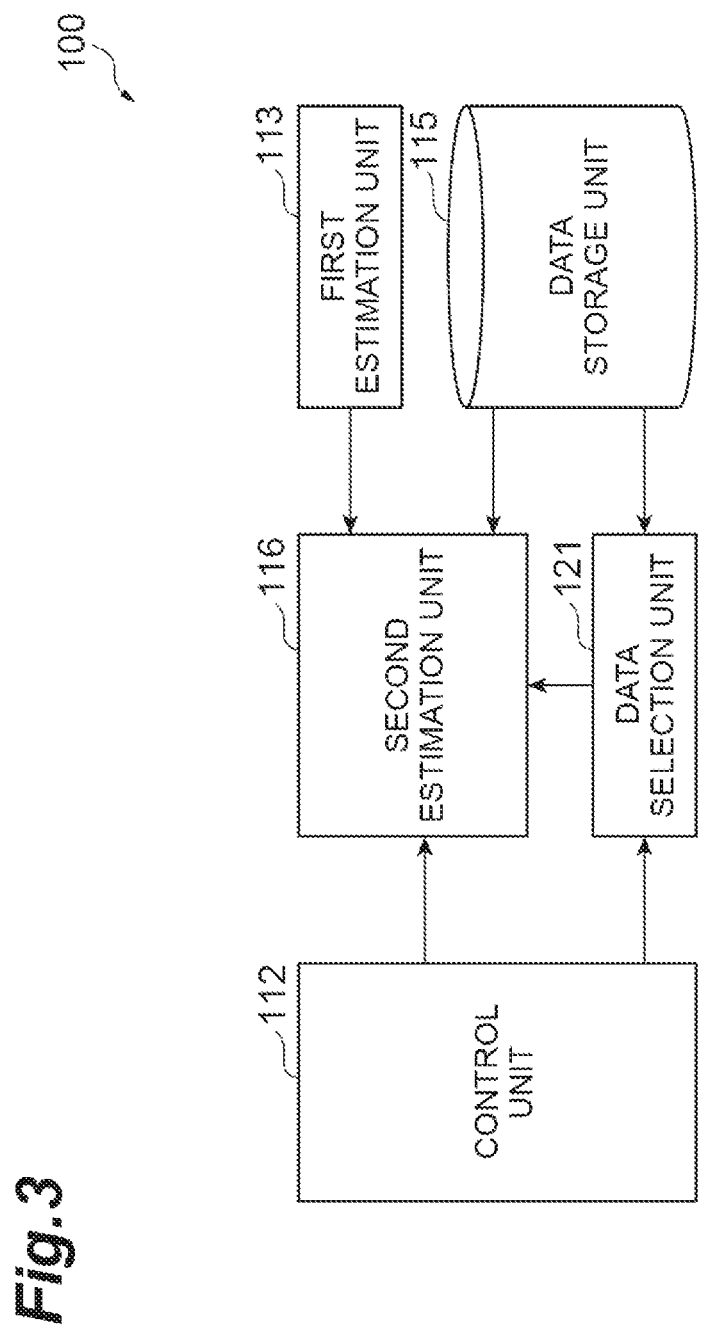
FIG. 3 is a block diagram illustrating a modification of a control device.

If the data storage unit 115 stores the plurality of profiles, the control device 100 may further include a data selection unit 121 as illustrated in FIG. 3. The data selection unit 121 is configured to select a profile corresponding to the motion pattern from the plurality of profiles of the data storage unit 115 when or before the control unit 112 starts driving the motor 2 based on the motion pattern. In this case, the second estimation unit 116 estimates the second external force based on the profile selected by the data selection unit 121.

Figure 4:
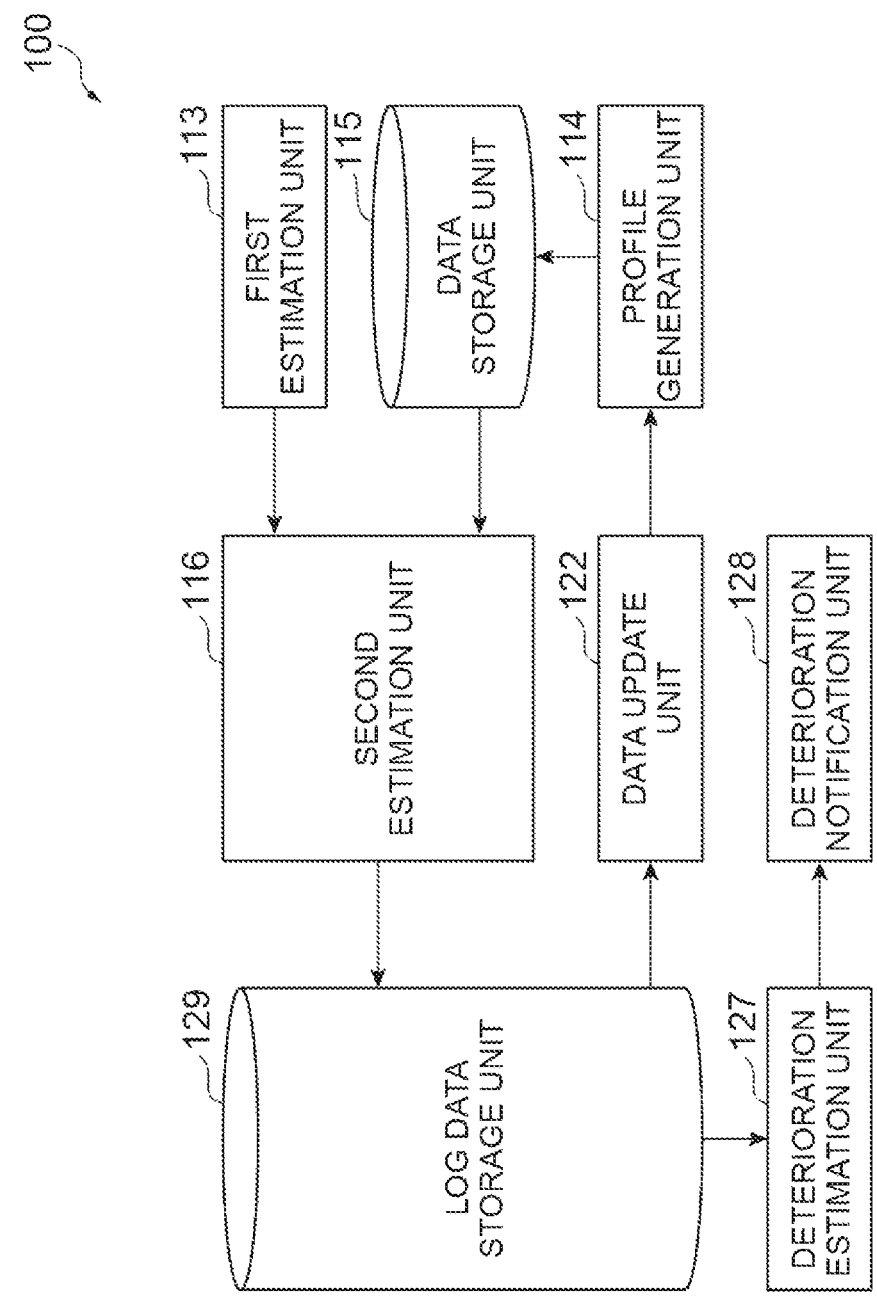
FIG. 4 is a block diagram illustrating another modification of the control device.

As illustrated in FIG. 4, the control device 100 may further include a data update unit 122. The data update unit 122 may be configured to update the profile (the first force profile) stored in the data storage unit 115. Updating includes both overwriting the existing profile and writing a new profile while leaving the existing profile as an old version.

The data update unit 122 may determine whether an update of the profile is required based on the profile stored in the data storage unit 115 and the estimation value newly estimated by the first estimation unit 113 (the second force), and update the profile based on the estimation value newly estimated by the first estimation unit 113 if it is determined that the profile needs to be updated.

The data update unit 122 may update the first force profile based, at least in part, on a comparison between a second force profile representing the second force over time during a duration of the second control, and the first force profile. For example, the control device 100 further includes a log data storage unit 129. The log data storage unit 129 is configured to store log data indicating a transition of a relationship between the estimation value newly estimated by the first estimation unit 113 and the profile. For example, the log data storage unit 129 stores the transition of the second external force estimated by the second estimation unit 116 in a period in which the control unit 112 drives the motor 2 based on the motion pattern.

The log data storage unit 129 may store the estimation value of the second external force and the motion pattern in association with each other. For example, the log data storage unit 129 may store a record in which the position and the speed of the motor 2 are associated with the estimation value of the second external force in time series. The position and the speed may be a target position and a target speed. The position and the speed may be the position and the speed detected by the sensor 3.

The data update unit 122 is configured to determine whether the update of the profile is required based on the log stored in the log data storage unit 129. For example, the data update unit 122 determines whether to update the profile based on whether the log satisfies a predetermined determination criterion (hereinafter referred to as "update determination criterion").

The profile may be updated when the above-described components that are difficult to model (Coulomb friction, viscous friction, variations in the shape, the size, and the weight of the driven object 4, and the like) change over time. Therefore, the update determination criterion is set in advance based on a characteristic that appears in the log data due to a change in the component that is difficult to model.

For example, if the Coulomb friction increases with time, it is considered that the log data uniformly increases over substantially the entire range from the start of recording to the completion of recording. Accordingly, an example of the update determination criterion is that the value of the estimation value of the second external force exceeds a predetermined threshold over the entire predetermined range in the log data.

If the viscous friction increases with time, it is considered that a correlation level between the speed and the second external force increases in the log data. Accordingly, another example of the update determination criterion is that the correlation level between the speed and the second external force in the log data exceeds a predetermined threshold.

If a bearing unit is deteriorated or damaged, it is considered that a periodic change appears in the second external force in the log data. Accordingly, still another example of the update determination criterion is that the magnitude of a frequency component exceeds a predetermined threshold in the frequency analysis result of the second external force of the log data.

Further, if there is a predetermined posture in which the driven object 4 can be assumed to be apparently unloaded, it may be an update determination criterion that the second external force exceeds a predetermined threshold when the driven target is in the predetermined posture.

If it is determined that the update is required, the data update unit 122 causes the profile generation unit 114 to regenerate the profile and update the profile of the data storage unit 115 with the regenerated profile. As shown as an example of the Coulomb friction, when the log data rises uniformly over the entire predetermined range, the data update unit 122 may add uniformly rising components over the entire profile stored in the data storage unit 115.

The control unit 112 may drive the motor 2 based on the motion pattern stored in the motion pattern storage unit 111 and the second external force estimated by the second estimation unit 116. For example, the control unit 112 may calculate a compensation value for external force tracking based on the second external force estimated by the second estimation unit 116, and perform impedance control for compensating the target position and the target speed based on the motion pattern in the acting direction of the second external force using the compensation value. The control unit 112 may calculate the compensation value based on a model generated in advance by machine-learning so as to represent the relationship between the second external force and the compensation value and the second external force newly estimated by the second estimation unit 116.

The control unit 112 may further execute feed-forward control of calculating a feed-forward compensation value based on the first external force estimated by the first estimation unit 113 and adding the feed-forward compensation value to the driving force command. In this case, the first estimation unit 113 may change an estimation condition for the first estimation value (for example, a filter condition for the driving force command) between the estimation of the first external force for calculating the feed-forward compensation value and the estimation of the first external force for estimating the second external force.

Figure 5:
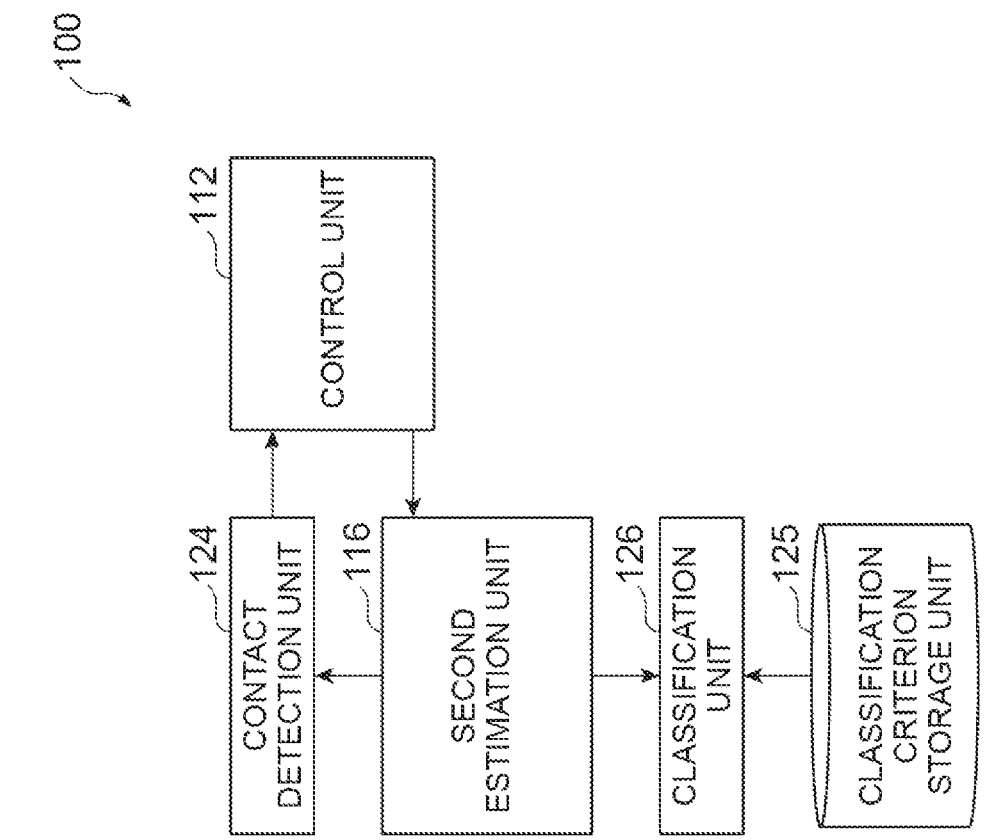
FIG. 5 is a block diagram illustrating still another modification of the control device.

As illustrated in FIG. 5, the control device 100 may further comprise a contact detection unit 124. For example, the contact detection unit 124 is configured to detect contact between the driven object 4 and the surrounding object based, at least in part, on the second external force estimated by the second estimation unit 116. For example, the contact detection unit 124 may detect the contact between the driven object 4 and the surrounding object based on the increase in the second external force estimated by the second estimation unit 116.

The control device 100 may be further configured to classify the driven result of the motor 2 (a result of the second control) based on the motion pattern into any of two or more classes based, at least in part, on the estimated second external force. For example, the control device 100 further includes a classification criterion storage unit 125 and a classification unit 126.

The classification criterion storage unit 125 is configured to store a criterion for classifying the driven result of the motor 2 into any of two or more classes. Examples of the two or more classes may include the quality of the operation result with respect to a predetermined reference, the quality of the workpiece after the driven object 4 directly or indirectly acts thereon, and the state of the workpiece after the driven object 4 directly or indirectly acts thereon.

For example, the classification unit 126 may classify the motion of the driven object 4 as "good" or "defective". For example, the classification criterion storage unit 125 stores an upper limit profile indicating the upper limit of the transition of the second external force when the motion of the driven object 4 is good and a lower limit profile indicating the lower limit of the transition of the second external force when the motion of the driven object 4 is good. The classification unit 126 classifies the motion of the driven object 4 as "good" when the estimation value of the second external force is located between the upper limit profile and the lower limit profile, and classifies the motion of the driven object 4 as "defective" when the estimation value of the second external force is located outside between the upper limit profile and the lower limit profile.

The classification unit 126 may classify the state of the workpiece on which the driven object 4 directly or indirectly acts as "good" or "defective". For example, the classification criterion storage unit 125 stores an upper limit profile indicating an upper limit of the transition of the second external force when the workpiece is good and a lower limit profile indicating a lower limit of the transition of the second external force when the workpiece is good. The classification unit 126 classifies the state of the workpiece as "good" when the estimation value of the second external force is located between the upper limit profile and the lower limit profile, and classifies the state of the workpiece as "defective" when the estimation value of the second external force is located outside between the upper limit profile and the lower limit profile.

The classification unit 126 may classify the state of the workpiece on which the driven object 4 directly or indirectly acts into three or more sub-classes. For example, the classification unit 126 may classify the dimensions of each part of the workpiece into three or more classes. For example, the classification criterion storage unit 125 stores a table, a function, or the like representing the relationship between the second external force and the dimension of the workpiece. The classification unit 126 calculates the dimensions of each part of the workpiece based on the table or function and the estimation value of the second external force.

The classification unit 126 may classify the driven result of the motor 2 based on the second external force estimated by the second estimation unit and the motion pattern on which the control unit 112 is based when the second external force is estimated. In this case, the classification criterion storage unit 125 may store the classification criterion for each motion pattern, and the classification unit 126 may select the classification criterion corresponding to the motion pattern on which the control unit 112 is based.

The classification criterion storage unit 125 may store a model generated in advance by machine-learning so as to represent the relationship between the second external force and the driven result of the motor 2. In this case, the classification unit 126 classifies the driven result based on the transition of the estimation value of the second external force (for example, the transition stored in the log data storage unit 129) and the model. The model may be generated to represent a relationship between a combination of the second external force and the motion pattern of the motor 2 when the second external force is generated and the driven result of the motor 2.

As an example, the classification criterion storage unit 125 stores a model generated so as to represent the relationship between the combination of the transition of the second external force and the motion pattern of the motor 2 when the transition of the second external force occurs and the state of the workpiece. The classification unit 126 classifies the state of the workpiece into three or more classes based on the transition of the estimation value of the second external force, the motion pattern on which the control unit 112 is based when the transition of the estimation value occurs, and the model.

The second estimation unit 116 estimates the second external force based on the first external force acting on the motor 2. Accordingly, the driven result of the motor 2 can be classified into two or more classes in consideration of a situation change occurring inside the control system 1 due to a failure or a slight variation of at least one of the driven object 4 and the motor 2. The degradation of the driven object 4 may be estimated based on the estimation result of the second external force. For example, as illustrated in FIG. 4, the control device 100 may further include a deterioration estimation unit 127 and a deterioration notification unit 128.

The deterioration estimation unit 127 is configured to estimate deterioration of the driven object 4 based, at least in part, on the second external force estimated by the second estimation unit 116. The deterioration notification unit 128 is configured to notify the deterioration of the driven object 4 estimated by the deterioration estimation unit 127 by transmission of notification data, notification display on display devices, or the like.

The estimation result of the second external force includes additional components caused by temporal changes in the above-described components that are difficult to model (Coulomb friction, viscous friction, variations in the shape, the size, and the weight of the driven object 4, and the like). The deterioration estimation unit 127 estimates deterioration of the driven object 4 based on the additional components.

For example, when the Coulomb friction increases with time, the log data includes an additional component that increases uniformly over substantially the entire range from the start of recording to the completion of recording. Accordingly, if the value of the estimation value of the second external force exceeds the predetermined threshold value over the entire predetermined range in the log data, the deterioration estimation unit 127 estimates the deterioration of the driven object 4 accompanied by the increase of the Coulomb friction.

If the viscous friction increases with time, it is considered that the correlation level between the speed and the second external force increases in the log data. Accordingly, if the correlation level between the speed and the second external force in the log exceeds a predetermined threshold, the deterioration estimation unit 127 estimates the degradation of the driven object 4 accompanied by increase in viscous friction.

If the bearing unit is deteriorated or damaged, it is considered that a periodic change appears in the second external force in the log data. Accordingly, the deterioration estimation unit 127 estimates the deterioration of the bearing unit when a magnitude of one or more frequency components exceed a predetermined threshold in the frequency analysis result of the second external force of the log data.

If there is a predetermined posture in which the driven object 4 can be assumed to be apparently unloaded, the deterioration estimation unit 127 may estimate the deterioration of the driven object 4 when the second external force when the driven object 4 is in the posture exceeds a predetermined threshold.

The deterioration estimation unit 127 may estimate the deterioration of the driven object 4 based on a model generated in advance by machine-learning so as to represent the relationship between the transition of the second external force and the deterioration of the driven object 4 and the transition of the second external force estimated by the second estimation unit 116.

Figure 6:
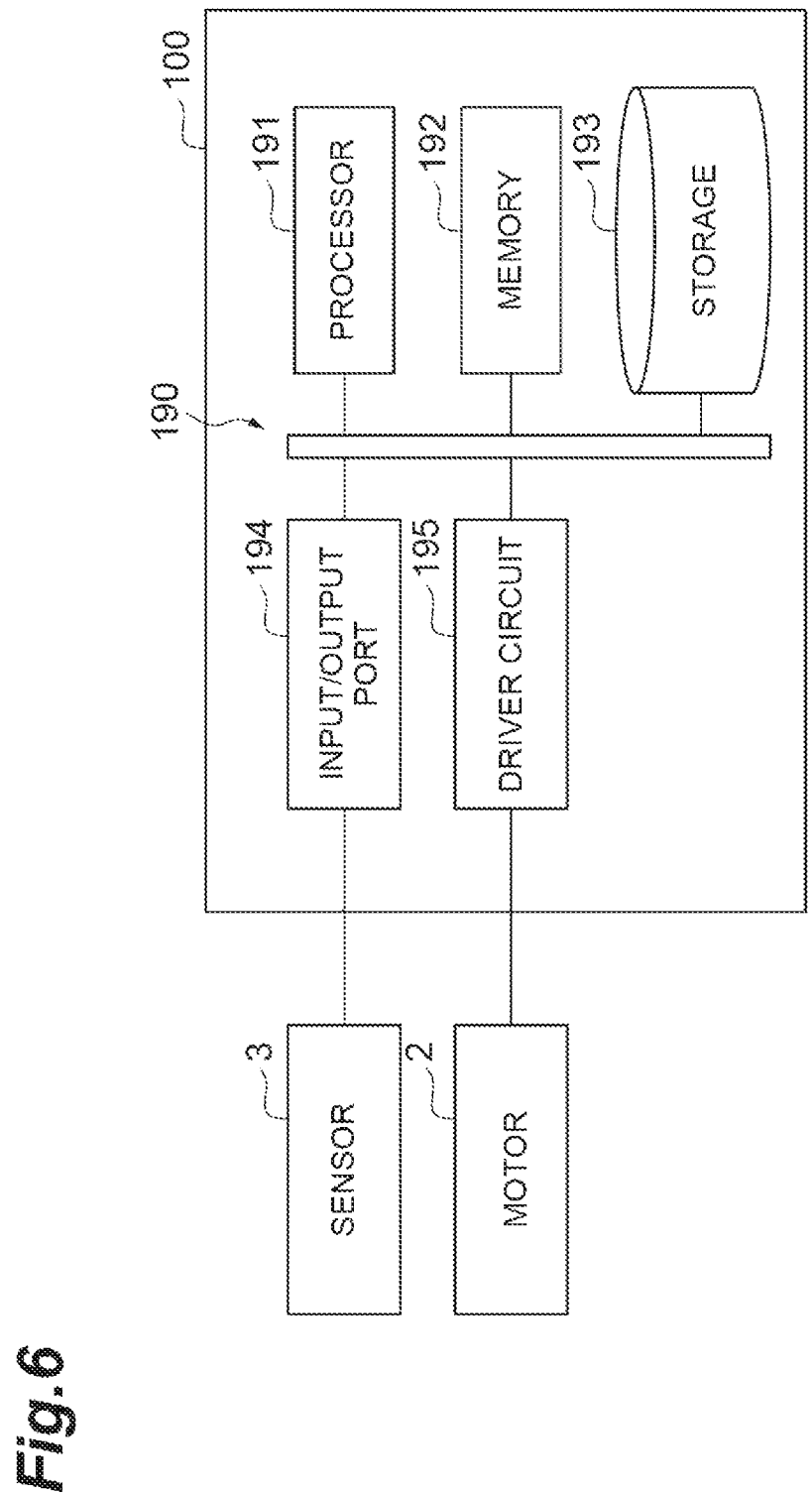
FIG. 6 is a diagram illustrating a hardware configuration of the control system.

FIG. 6 is a block diagram illustrating a hardware configuration of the control device 100. As illustrated in FIG. 6, the control device 100 includes circuitry 190. The circuitry 190 includes one or more a processor 191, a memory 192, storage 193, an input/output port 194, and a driver circuit 195. The storage 193 includes a computer-readable storage medium such as a nonvolatile semiconductor memory. The storage 193 stores a program for causing the control device 100 to execute: driving the motor 2; estimating the first external force acting on the motor 2 based, at least in part, on the driving force command for driving the motor 2; storing the profile representing the transition of the estimation value of the first external force in the data storage unit; and estimating the second external force acting on the driven object 4 based on the newly estimated first external force and the profile stored in the data storage unit 115 when driving the motor 2 based on the predetermined motion pattern. For example, the storage 193 stores a program for configuring each functional block described above in the control device 100.

The memory 192 temporarily stores the program loaded from the storage medium of the storage 193 and the operation result by the processor 191. The processor 191 configures each functional block of the control device 100 by executing the program in cooperation with the memory 192. The input/output port 194 inputs and outputs electrical signals to and from the sensor 3 in accordance with instructions from the processor 191. The driver circuit 195 outputs driving electric power to the motor 2 in accordance with instructions from the processor 191.

The control device 100 may not be limited to one that configures each function by a program. For example, at least a part of the functions of the control device 100 may be configured by dedicated logic circuitry or an application specific integrated circuit (ASIC) in which the dedicated logic circuitry is integrated.

Control Procedure Hereinafter, a control procedure executed by the control device 100 will be described as an example of the control method. The control procedure includes: driving the motor 2; estimating the first external force acting on the motor 2 based at least on the driving force command for driving the motor 2; storing the profile representing the transition of the estimation value of the first external force in a data storage unit; and estimating the second external force acting on the driven object 4 based on the newly estimated first external force and the profile stored in the data storage unit when driving the motor 2 based on the predetermined motion pattern. The control procedure may further include generating the profile. Hereinafter, a generation procedure of the profile and a driving procedure of the motor 2 based on the generated profile will be described.

Figure 7:
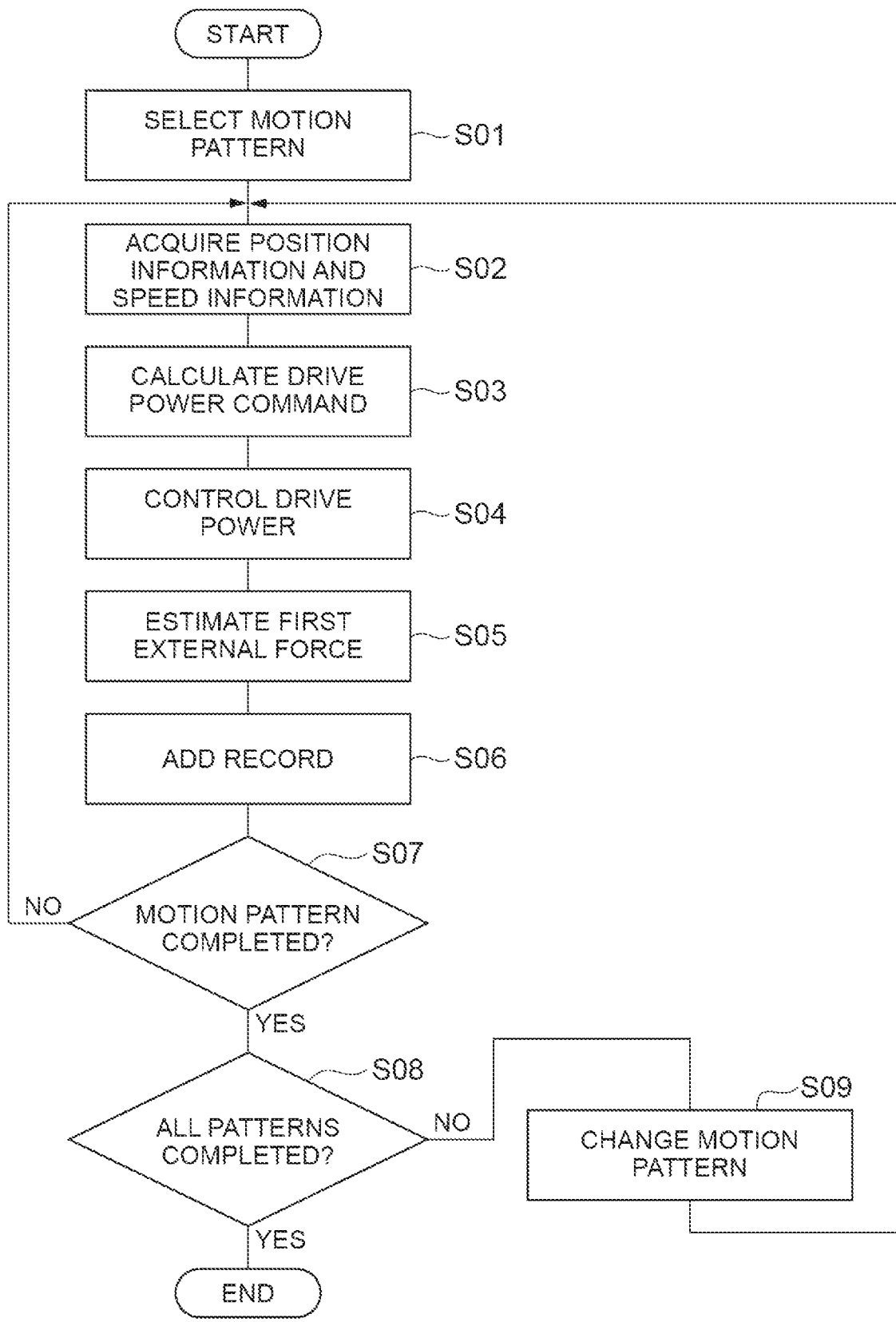
FIG. 7 is a flowchart illustrating a generation procedure of the profile.

Profile Generation Procedure FIG. 7 is a flowchart illustrating a procedure of generating the profile for each motion pattern when the motion pattern storage unit 111 stores a plurality of motion patterns.

As illustrated in FIG. 7, the control device 100 first executes operations S01, S02, S03, S04, S05, S06, and S07. In the operation S01, the profile generation unit 114 selects one of a plurality of motion patterns of the motion pattern storage unit 111. Hereinafter, the selected motion pattern is referred to as "target motion pattern". In the operation S02, the control unit 112 acquires information on the current position and the current speed of the driven object 4 based on the detection value of the sensor 3.

In the operation S03, the control unit 112 calculates the driving force command based on the target position and the target speed based on the target motion pattern and the current position and the current speed of the driven object 4. For example, the control unit 112 executes a proportional operation, a proportional-integral operation, or a proportional-integral-differential operation on the deviation between the target position and the current position (hereinafter referred to as "positional deviation") to calculate a target speed for reducing the position deviation. Thereafter, the control unit 112 executes a proportional operation, a proportional-integral operation, or a proportional-integral-differential operation on the deviation between the target speed and the current speed (hereinafter referred to as "speed deviation") to calculate a driving force command for reducing the speed deviation.

In the operation S04, the control unit 112 calculates a current command for controlling the driving force of the motor 2 to follow the driving force command, and generates the driving electric power so as to supply a driving current corresponding to the current command to the motor 2. In the operation S05, the first estimation unit 113 estimates the first external force acting on the motor 2 based, at least in part, on the driving force command in the control unit 112.

In the operation S06, the profile generation unit 114 adds a record including the first external force estimated by the operation S05 to the profile of the target motion pattern. For example, the profile generation unit 114 adds a record to the storage area of the profile in the motion pattern storage unit 111. In the operation S07, the profile generation unit 114 checks whether the operation of the motor 2 according to the target motion pattern is completed.

If it is determined in the operation S07 that the motion of the motor 2 according to the target motion pattern is not completed, the control device 100 returns the process to the operation S02. Thereafter, the addition of the record to the profile corresponding to the target motion pattern is repeated until the operation of the motor 2 according to the target motion pattern is completed. As a result, the profile representing the transition of the first external force is generated.

If it is determined in the operation S07 that the motion of the motor 2 according to the target motion pattern is completed, the control device 100 executes a operation S08. In the operation S08, the profile generation unit 114 checks whether the generation of the profile has been completed for all the motion patterns stored in the motion pattern storage unit 111.

If it is determined in the operation S08 that there remains a motion pattern for which the generation of the profile is not completed, the control device 100 executes a operation S09. In the operation S09, the profile generation unit 114 changes the target motion pattern to another motion pattern for which the profile is not generated. The profile generation unit 114 then returns the process to the operation S02. Thereafter, the selection of the motion pattern and the generation of the profile are repeated until the profile is generated for all the motion patterns.

If it is determined in the operation S08 that the generation of the profile has been completed for all motion patterns, the control device 100 completes the generation of the profile.

Driving Procedure

Figure 8:
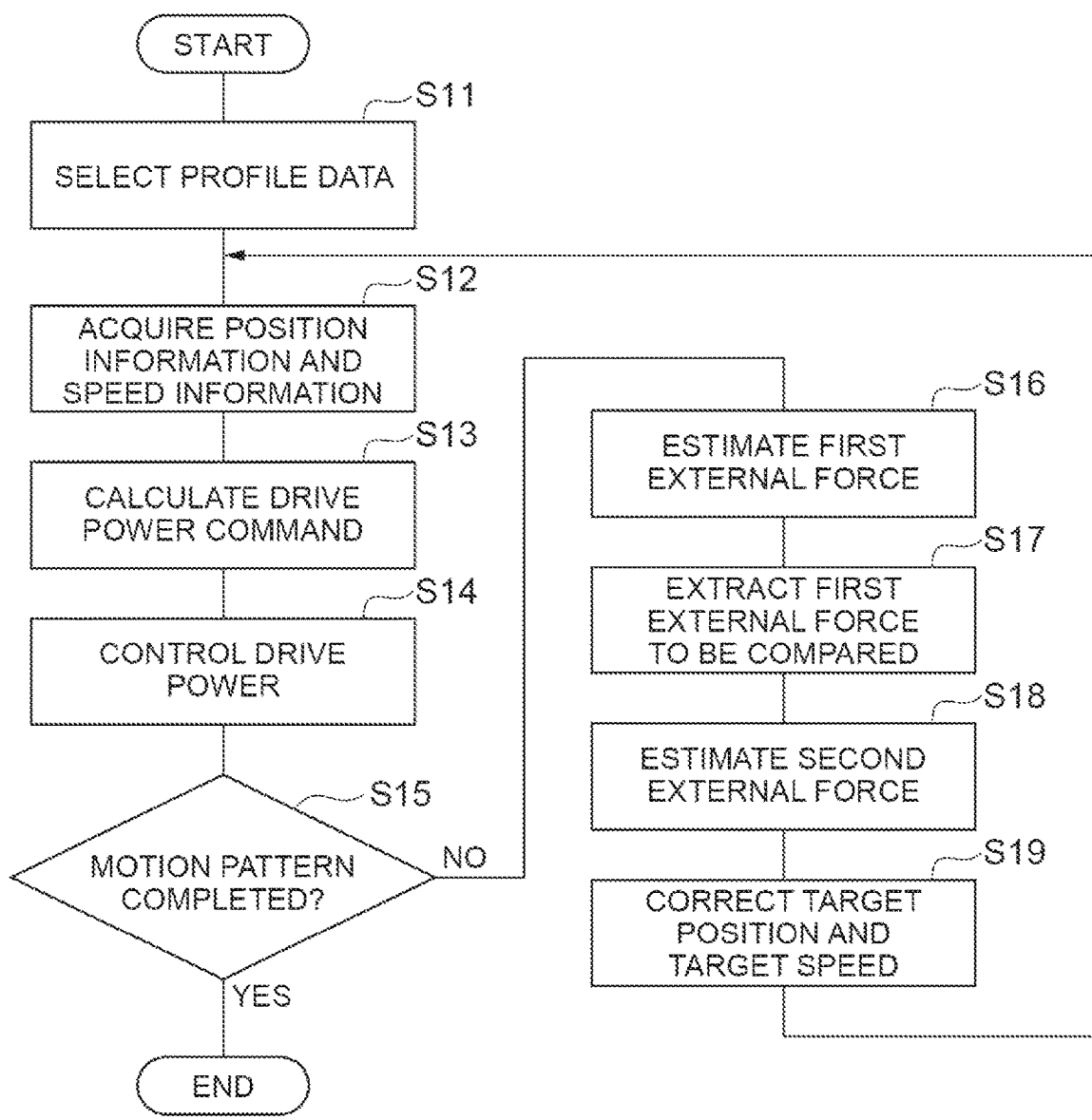
FIG. 8 is a flowchart illustrating a motor driving procedure.

FIG. 8 is a flowchart illustrating a motor driving procedure. For example, FIG. 8 illustrates a flowchart of an impedance control procedure for changing a target position and a target speed based on the motion pattern based on the estimation result of the second external force.

As illustrated in FIG. 8, the control device 100 first executes operations S11, S12, S13, S14, and S15. In the operation S11, the data selection unit 121 selects the profile corresponding to a motion pattern on which the control unit 112 is based (a motion pattern selected by the motor 2 to drive the motor 2) from the plurality of profiles of the data storage unit 115. Hereinafter, the motion pattern on which the control unit 112 is based is referred to as "drive motion pattern", and the profile selected is referred to as "selected profile".

In the operation S12, the control unit 112 acquires information on the current position and the current speed of the driven object 4 based on the detection value of the sensor 3. In the operation S13, the control unit 112 calculates the driving force command based on the target position and the target speed based on the drive motion pattern and the current position and the current speed of the driven object 4, similarly to the operation S03. In the operation S14, the control unit 112 generates the driving electric power so that the driving force of the motor 2 follows the driving force command, similarly to the operation S04. In the operation S15, the profile generation unit 114 checks whether the operation of the motor 2 according to the drive motion pattern is completed.

If it is determined in the operation S15 that the operation of the motor 2 according to the drive motion pattern is not completed, the control device 100 executes operations S16, S17, S18, and S19. In the operation S16, the first estimation unit 113 newly estimates the first external force acting on the motor 2 based, at least in part, on the driving force command in the control unit 112. In the operation S17, the second estimation unit 116 extracts an estimation value (the estimation value of comparison target) corresponding to an estimation value newly estimated by the first estimation unit 113 (the new estimation value) from the selected profile.

In the operation S18, the second estimation unit 116 estimates the second external force based on the difference between the new estimation value and the estimation value of comparison target. In the operation S19, the control unit 112 calculates a compensation value based on the estimation value of the second external force, and changes the next target position and target speed based on the drive motion pattern to the acting direction of the second external force. The control device 100 then returns the process to the operation S12. Thereafter, until the drive motion pattern is completed, the motor 2 is continuously driven based on the drive motion pattern while estimating the second external force and changing the target position and the target speed based on the estimation result.

If it is determined in the operation S15 that the operation of the motor 2 according to the drive motion pattern is completed, the driving of the motor 2 based on the drive motion pattern is completed.

Figure 9:
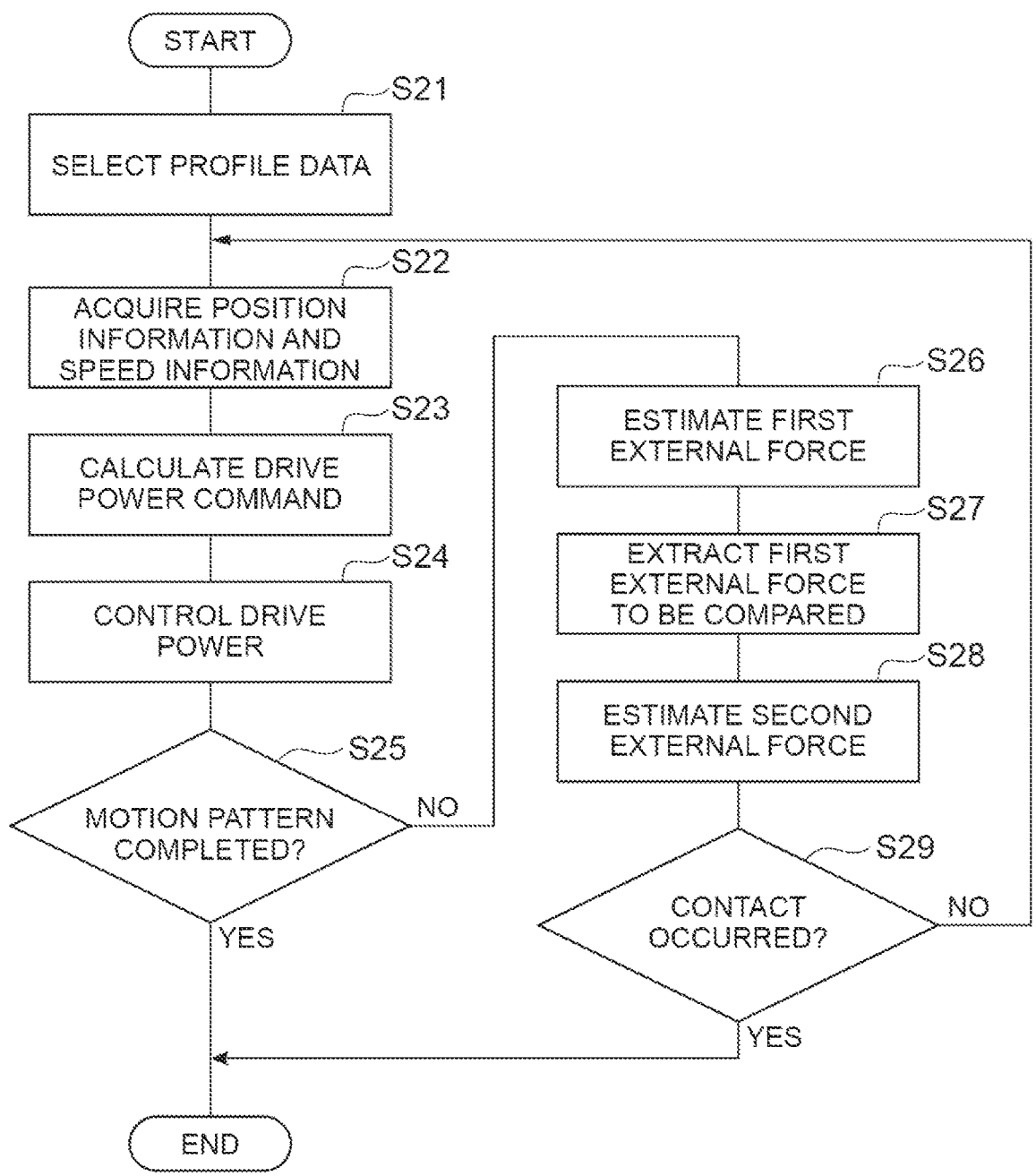
FIG. 9 is a flowchart illustrating a modification of the motor driving procedure.

FIG. 9 is a flowchart illustrating a modification of the motor driving procedure. For example, FIG. 9 illustrates a control procedure for detecting contact between the driven object 4 and the surrounding object based on the estimation result of the second external force. Operations S21 to S28 from the selection of the drive motion pattern to the estimation of the second external force are the same as the operations Si 1 to S18 described above. After estimating the second external force in the operation S28, the control device 100 executes a operation S29. In the operation S29, the contact detection unit 124 checks whether or not the driven object 4 and the surrounding object are in contact with each other based on the estimation value of the second external force.

If it is determined in the operation S29 that the driven object 4 is not in contact with the surrounding object, the control device 100 returns the process to the operation S22. Thereafter, the driving of the motor 2 based on the drive motion pattern is continued while monitoring whether contact between the driven object 4 and the surrounding object happens.

If it is determined in the operation S29 that the driven object 4 and the surrounding object are in contact with each other, the control device 100 forcibly completes the series of processes without returning to the operation S22. This completes the driving of the motor 2 based on the drive motion pattern.

Figure 10:
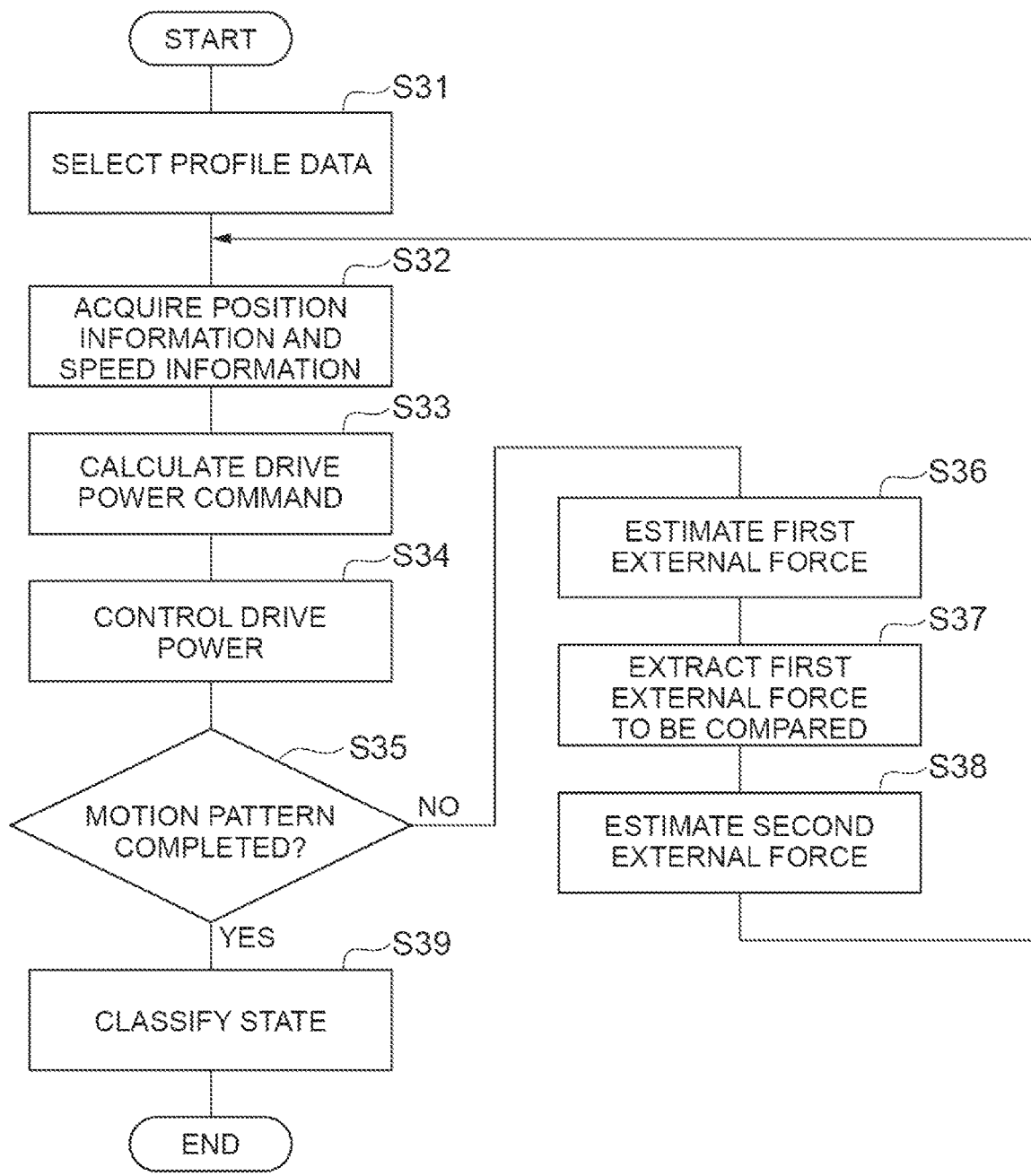
FIG. 10 is a flowchart illustrating another modification of the motor driving procedure.

FIG. 10 is a flowchart illustrating another modification of the motor 2 driving procedure. For example, FIG. 10 illustrates a procedure of classifying the state of the workpiece into two or more classes based on the estimation result of the second external force after the driving of the motor 2 based on the motion pattern is completed. Operations S31 to S38 from the selection of the drive motion pattern to the estimation of the second external force are the same as the operations S11 to S18 described above. After estimating the second external force in the operation S38, the control device 100 returns processing to the operation S32. Thereafter, the driving of the motor 2 based on the drive motion pattern is continued until the drive motion pattern is completed.

If it is determined that the operation of the motor 2 according to the drive motion pattern is completed in the operation S35, the control device 100 executes a operation S39. In the operation S39, the classification unit 126 classifies the state of the workpiece on which the driven object 4 directly or indirectly acts into two or more classes based, at least in part, on the estimation result of the second external force. In the operation S39, instead of or in addition to the classification of the state of the workpiece by the classification unit 126, the deterioration estimation unit 127 may estimate the deterioration of the driven object 4 based, at least in part, on the estimation result of the second external force. This completes the driving of the motor 2 based on the drive motion pattern.

Example Application

The above-described configuration is also applicable to a system including a plurality of motors and the driven object includes a plurality of rigid body. For example, the above-described configuration can also be applied to a robot system including an articulated robot illustrated in FIG. 11.

Figure 11:
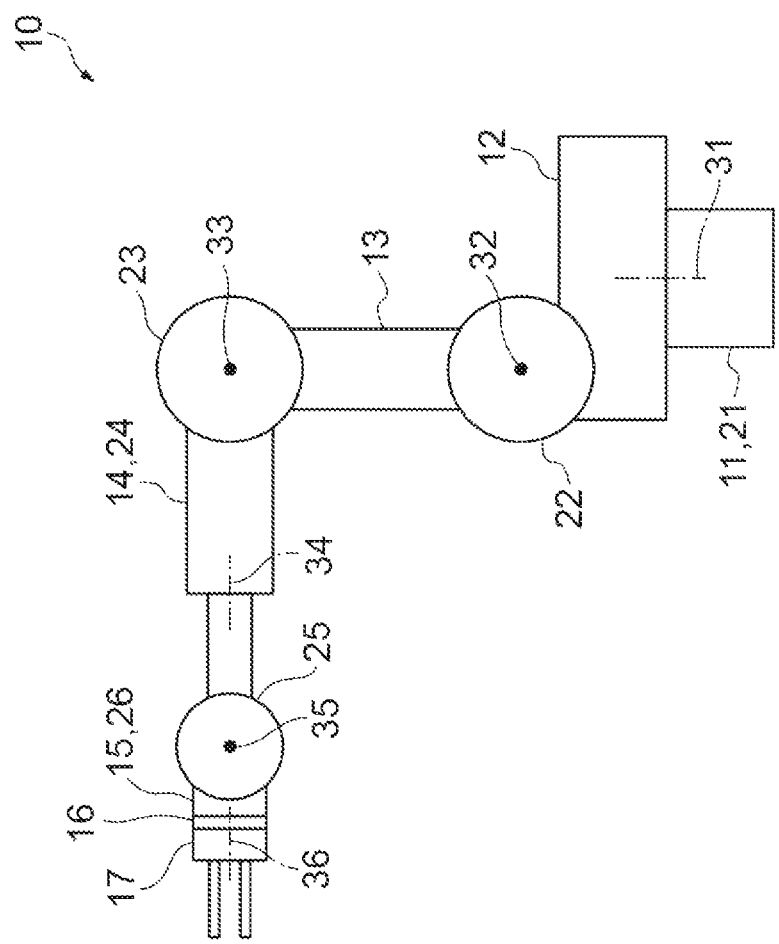
FIG. 11 is a diagram illustrating a schematic configuration of a robot.

A robot 10 illustrated in FIG. 11 is a so-called six-axis vertical articulated robot, and includes a base 11, a turning portion 12, arms 13, 14, and 15, and a tool holder 16. The base 11 is fixed on a floor, a table, or an automated guided vehicle (AGV) in the work area. The turning portion 12 is provided on the base 11 so as to turn around the vertical an axis 31.

The arm 13 is connected to the turning portion 12 so as to swing around an axis 32 intersecting (for example, orthogonal to) the axis 31. Here, the intersecting includes a case in which there is a twisted relationship such as a so-called three-dimensional intersection. The arm 14 is connected to the distal end of the arm 13 so as to swing around an axis 33 that is parallel to the axis 32. The arm 15 is connected to the distal end of the arm 14 to turn around an axis 34 that intersects the axis 33 along the arm 14 and to swing around an axis 35 that intersects (for example, is orthogonal to) the axis 34.

The tool holder 16 is connected to the distal end of the arm 15 so as to turn around an axis 36 along the center of the arm 15. The tool holder 16 holds various tools 17 such as a hand for gripping the workpiece, a welding torch, a paint gun, or a screwing tool.

A motor 21 turns the turning portion 12 around the axis 31. A motor 22 swings the arm 13 around the axis 32. A motor 23 swings the arm 14 around the axis 33. A motor 24 turns the distal end of the arm 14 around the axis 34. A motor 25 swings the arm 15 around the axis 35. A motor 26 turns the tool holder 16 around the axis 36.

In the control system 1, the tool holder 16 and the tool 17 are driven objects of the motor 26. The arm 15, the tool holder 16, and the tool 17 are driven objects of the motor 25. The distal end of the arm 14, the arm 15, the tool holder 16 and the tool 17 are driven objects of the motor 24. The arms 14 and 15, the tool holder 16 and the tool 17 are driven objects of the motor 23. The arms 13, 14, and 15, the tool holder 16, and the tool 17 are driven objects of the motor 22.

The turning portion 12, the arms 13, 14, and 15, the tool holder 16 and the tool 17 are driven objects of the motor 21.

In a configuration in which a driven object of one motor includes another motor like the above-described configuration, the shape and moment of inertia of the driven object by the motor may change. For example, the shape and moment of inertia of the driven objects by the motor 21 is changed by driving the motors 22, 23, 24, 25, and 26. In such a case, the profile generation unit 114 may generate the profile in which the transition of the estimation value of the first external force is associated with the motion pattern of the entire the robot 10 for each of the motors 21, 22, 23, 24, 25, and 26, and store the profile in the data storage unit 115. Examples of the motion pattern of the entire the robot 10 may include temporal transition of the target position and target posture of the tool holder 16.

In this case, the first estimation unit 113 outputs a new estimation value based on the driving force command to each of the motor 21, 22, 23, 24, 25, and 26. The second estimation unit 116 extracts the estimation value of comparison target from each of the profile, and estimates the second external force based on the difference between the new estimation value and the estimation value of comparison target, for each of the motor 21, 22, 23, 24, 25, and 26.

As described above, the control system 1 includes: the motor 2 configured to drive the driven object 4; the control unit 112 configured to drive the motor 2; the first estimation unit 113 configured to estimate the first external force acting on the motor 2 based, at least in part, on the driving force command in the control unit 112; the data storage unit 115 configured to store the profile representing the transition of the estimation value estimated by the first estimation unit 113; and the second estimation unit 116 configured to estimate the second external force acting on the driven object 4 based on the estimation value newly estimated by the first estimation unit 113 and the profile stored in the data storage unit 115 when the control unit 112 drives the motor 2 based on a predetermined motion pattern.

The first external force acting on the motor 2 includes components that are difficult to model, such as Coulomb friction, viscous friction, and variations in the shape, the size, and the weight of the driven object 4 driven by the motor 2. These components may cause a decrease in the estimation accuracy of an external force (the second external force acting on the driven object 4) based on forces acting on the motor 2. In contrast, by the control device 100, the external force is estimated based on the first external force newly estimated while the motor 2 is operating according to the motion pattern and the profile representing the transition of the first external force estimated in the past. If the newly estimated first external force includes a component that is difficult to model as described above, the previously estimated first external force also includes a similar component. Accordingly, based on the newly estimated first external force and the profile representing the transition of the first external force estimated in the past, the external force may be estimated while eliminating the influence of the component that is difficult to model. Therefore, the estimation accuracy of the external force may be improved.

The profile may represent the transition of the estimation value estimated by the first estimation unit 113 when the control unit 112 drove the motor 2 based on the motion pattern in the past. In this case, since the second external force can be estimated based on the new first external force estimated while driving the motor 2 according to the motion pattern and the past first external force estimated while driving the motor 2 according to the same motion pattern, the estimation accuracy of the external force is further improved.

The profile may represent the transition of the estimation value estimated by the first estimation unit 113 in a state in which an external force is not applied to the driven object 4. In this case, the estimation accuracy of the external force is further improved by using the profile in a state where the external force does not act on the driven object 4 as a reference.

The data storage unit 115 may be configured to store the plurality of profiles including the profile. The plurality of profiles may respectively correspond to a plurality of motion patterns. Each of the plurality of profiles may represent the transition of the estimation value estimated by the first estimation unit 113 when the control unit 112 drove the motor in the past based on the corresponding motion pattern. The control unit 112 may drive the motor 2 based on one of the plurality of motion patterns. The control system 1 may further include the data selection unit that selects the profile corresponding to a motion pattern on which the control unit 112 is based from the plurality of profiles. The second estimation unit 116 may be configured to estimate the second external force based on the profile selected by the data selection unit 121. In this case, the estimation accuracy of the external force can be further improved by providing the profile for each motion pattern and selectively using the profile in accordance with the motion pattern.

The first estimation unit 113 may be the disturbance observer configured to estimate the first external force based, at least in part, on the driving force command and a response value of the motor 2. In this case, the estimation accuracy of the external force is further improved. Hereinafter, a component which can be modeled among the influences of the motion of the driven object 4 on the motor 2 is referred to as "modeled influences". For example, by using the disturbance observer, the first external force which is obtained by removing the modeled influences from the external force acting on the motor 2 may be estimated. According to the first external force estimated by removing the modeled influences, even when a deviation occurs between the actual motion of the driven object 4 and the motion pattern, the modeled influences are removed in advance from both the estimation value of the newly estimated first external force and the profile. Accordingly, the deviation hardly affects the estimation accuracy of the second external force.

The second estimation unit 116 may be configured to: extract the estimation value corresponding to the newly estimated estimation value from the profile; and estimate the second external force based on the difference between the newly estimated estimation value and the extracted estimation value. In this case, the second external force can be easily estimated.

The second estimation unit 116 may be configured to extract the estimation value corresponding to the newly estimated estimation value (hereinafter also referred to as "estimation value of comparison target" in some cases) from the profile based on the driving time according to the motion pattern. In this case, the estimation value of comparison target can be easily extracted based on the driving time by the motion pattern.

The second estimation unit 116 may be configured to extract an estimation value corresponding to the newly estimated estimation value from the profile based on the response value of the motor 2. In this case, based on the response value of the motor 2, the estimation value corresponding to the newly estimated estimation value can be extracted. For example, the second estimation unit 116 may extract the estimation value of comparison target based on the current position of the motor 2, may extract the estimation value of comparison target based on the current speed of the motor 2, or may extract the estimation value of comparison target on both the current position and the current speed of the motor 2. If the estimation value of comparison target is extracted based on the current position of the motor 2, the estimation accuracy of the external force can be further improved by extracting the estimation value at a position close to the current position. If the estimation value of comparison target is extracted based on the current speed of the motor 2, the estimation accuracy of the external force can be further improved by extracting the estimation value at a speed close to the current speed. If the estimation value of comparison target is extracted based on both the current position and the current speed of the motor 2, the estimation accuracy of the external force can be further improved by extracting the estimation value at a position close to the current position and at a speed close to the current speed.

The control system 1 may further include the data update unit 122 configured to update the profile. In this case, the estimation accuracy of the external force can be maintained.

The data update unit 122 may be configured to: determine whether an update is required based on the profile stored in the data storage unit 115 and the estimation value newly estimated by the first estimation unit 113; and update, if it is determined that the update is required, the profile based on the estimation value newly estimated by the first estimation unit 113. In this case, the profile may be timely updated in response to a change in a situation such as aged deterioration or an environmental change. Therefore, the estimation accuracy of the external force is further improved.

The control unit 112 may be configured to drive the motor 2 based on the motion pattern and the second external force estimated by the second estimation unit 116. In this case, torque control may be executed without a torque sensor.

The control system 1 may further include the classification unit 126 configured to classify the driven result of the motor 2 by the control unit 112 based on the motion pattern into two or more classes based, at least in part, on the second external force estimated by the second estimation unit 116. In this case, improvement of the estimation accuracy of the external force contributes to estimation of the states of the driven object 4 and the surrounding object. As described above, the second estimation unit 116 estimates the second external force based on the first external force acting on the motor 2. Therefore, the driven result of the motor 2 can be classified into two or more classes in consideration of a situation change occurring inside the control system 1 due to a failure or a slight variation of at least one of the driven object 4 and the motor 2.

The classification unit 126 may classify the driven result based on the second external force estimated by the second estimation unit 116 and the motion pattern on which the control unit 112 is based when the second external force is estimated. In this case, the driven result may more accurately classified based on both the motion pattern and the second external force.

The control system 1 may further include the deterioration estimation unit 127 configured to estimate deterioration of the driven object 4 based, at least in part, on the second external force estimated by the second estimation unit 116. In this case, the estimation result of the external force can also be used to predict deterioration of the driven object 4.

The control system 1 may further include the contact detection unit 124 configured to detect contact between the driven object 4 and the surrounding object based, at least in part, on the second external force estimated by the second estimation unit 116. In this case, the improvement of the estimation accuracy of the external force contributes to contact detection.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A control system comprising:
    a motor configured to power a driven object; and
    circuitry configured to:
        generate a first driving force command to drive the motor during a first control;
        estimate a first force acting on the motor during the first control based, at least in part, on the first driving force command;
        generate a second driving force command to drive the motor during a second control after the first control;
        estimate a second force acting on the motor during the second control based, at least in part, on the second driving force command; and
        estimate an external force acting on the driven object during the second control based, at least in part, on a comparison between the first force and the second force.

2. The control system according to claim 1, wherein the circuitry is further configured to drive the motor according to a common motion pattern during both the first control and the second control.

3. The control system according to claim 2, wherein the circuitry is further configured to execute the first control without the external force acting on the driven object.

4. The control system according to claim 2, wherein the first control comprises driving the motor according to a plurality of predetermined motion patterns, and
    wherein the circuitry is further configured to:
        store a plurality of force profiles each of which represents the first force over time during a duration of time of the first control according to a corresponding motion pattern of the plurality of motion patterns;
        select one motion pattern from the plurality of motion patterns;
        generate the second driving force command to drive the motor according to the selected one motion pattern during the second control; and
        estimate the external force based, at least in part, on a comparison between the second force and one of the plurality of force profiles corresponding to the selected one motion pattern.

5. The control system according to claim 2, wherein the circuitry is further configured to:
    estimate a first disturbance acting on the motor as the first force based, at least in part, on the first driving force command and a motion of the motor responding to the first driving force command; and
    estimate a second disturbance acting on the motor as the second force based, at least in part, on the second driving force command and a motion of the motor responding to the second driving force command.

6. The control system according to claim 2, wherein the circuitry is further configured to:

store a first force profile representing the first force over time during a duration of the first control; and estimate the external force based, at least in part, on a comparison between the second force and the first force profile.

7. The control system according to claim 6, wherein the circuitry is further configured to:
extract a base value corresponding to the second force from the first force profile; and
estimate the external force based, at least in part, on a difference between the second force and the extracted base value.

8. The control system according to claim 7, wherein the circuitry is further configured to extract the base value from the first force profile based, at least in part, on an elapsed time during the second control.

9. The control system according to claim 7, wherein the circuitry is further configured to:
store the first force profile further representing a relation between a motion of the motor responding to the driving force command, and the first force; and
extract the base value based, at least in part, on a motion of the motor responding to the second driving force command during the second control.

10. The control system according to claim 6, wherein the circuitry is further configured to update the first force profile based, at least in part, on the second force.

11. The control system according to claim 10, wherein the circuitry is further configured to update the first force profile based, at least in part, on a comparison between the second force and the first force profile.

12. The control system according to claim 11, wherein the circuitry is further configured to update the first force profile based, at least in part, on a comparison between a second force profile representing the second force over time during a duration of the second control, and the first force profile.

13. The control system according to claim 2, wherein the circuitry is further configured to drive the motor based, at least in part, on the common motion pattern and the estimated external force during the second control.

14. The control system according to claim 2, wherein the circuitry is further configured to classify a result of the second control into two or more classes based, at least in part, on the estimated external force.

15. The control system according to claim 14, wherein the circuitry is further configured to classify the result of the second control based, at least in part, on the estimated external force and the common motion pattern.

16. The control system according to claim 1, wherein the circuitry is further configured to estimate a deterioration of the driven object based, at least in part, on the estimated external force.

17. The control system according to claim 1, wherein the circuitry is further configured to detect a contact between the driven object and a surrounding object based, at least in part, on the estimated external force.

18. A control method comprising:
generating a first driving force command to drive a motor during a first control, wherein the motor is configured to power a driven object;
estimating a first force acting on the motor during the first control based, at least in part on the first driving force command;
generating a second driving force command to drive the motor during a second control;
estimating a second force acting on the motor during the second control based, at least in part on the second driving force command; and
estimating an external force acting on the driven object based, at least in part, on a difference between the first force and the second force.

19. The control method according to claim 18, wherein the motor is driven according to a common motion pattern during both the first control and the second control.

20. A non-transitory memory device having instructions stored thereon that, in response to execution by a processing device, cause the processing device to perform operations comprising:
generating a first driving force command to drive a motor during a first control, wherein the motor is configured to power a driven object;
estimating a first force acting on the motor during the first control based, at least in part on the first driving force command;
generating a second driving force command to drive the motor during a second control;
estimating a second force acting on the motor during the second control based, at least in part on the second driving force command; and
estimating an external force acting on the driven object based, at least in part, on a difference between the first force and the second force.

* * * * *